Nov. 30, 1965          W. JONES          3,221,152

CLASSIFICATION METHOD AND APPARATUS

Filed March 14, 1961          10 Sheets-Sheet 1

Nov. 30, 1965     W. JONES     3,221,152
CLASSIFICATION METHOD AND APPARATUS
Filed March 14, 1961     10 Sheets-Sheet 6

Nov. 30, 1965  W. JONES  3,221,152
CLASSIFICATION METHOD AND APPARATUS
Filed March 14, 1961  10 Sheets-Sheet 9

Fig.11B

Nov. 30, 1965   W. JONES   3,221,152
CLASSIFICATION METHOD AND APPARATUS
Filed March 14, 1961   10 Sheets-Sheet 10

Fig.IIC

United States Patent Office 3,221,152
Patented Nov. 30, 1965

3,221,152
CLASSIFICATION METHOD AND APPARATUS
Wallace Jones, Saltsburg, Pa., assignor to Nuclear Materials and Equipment Corporation, Apollo, Pa., a corporation of Pennsylvania
Filed Mar. 14, 1961, Ser. No. 108,220
15 Claims. (Cl. 235—151.13)

This invention relates to the classification art and has particular relationship to the classification of objects in accordance with their respective densities. In its specific aspects this invention concerns itself with the detection of small deviations in density of objects from a standard or norm and classification of these objects in accordance with such selection and it is an object of this invention to effect such detection and classification with high precision.

Nuclear reactors include fuel assemblies the basic fuel element of which is a pellet of a fissionable material. It is essential that the density of these elements be maintained within tight tolerances to avoid over or under concentration of neutronic reaction, and it is a specific object of this invention to provide a method and apparatus for classifying such elements so as to select for neutronic use only those elements having densities within such tight tolerances.

It is another object of this invention to provide computer apparatus, particularly suitable for use in the classification of neutronic pellets, for precise comparison of the volume of an object or article with a norm or standard. It is a still further object of this invention to provide such apparatus for precise detection of the deviation of the weight of an object from a standard.

It is an additional object of this invention to provide a computer, relatively simple in its structure and operation, and particularly suitable for use in processing neutronic pellets, for determining density deviation of an object from its weight and volume deviation.

An incidental object of this invention is to provide novel article advancing apparatus particularly suitable for use in the classification of neutronic pellets.

Another incidental object of this invention is to provide a channel for advancing articles or objects, such as cylindrical neutronic pellets, while maintaining one dimension of each article, for example, the axis of each pellet, generally perpendicular to the direction of movement.

The novel method and apparatus for precise classification of objects according to this invention has as its basis determination of the deviation of the density from volume and weight measurements. In accordance with this invention this determination is made in an unusual manner by a computation from the measured dimension deviations and measured weight deviation of each object and the invention includes within its scope the method of making the computation, a computer for making the computation, and classification apparatus. The length and diameter of each object is gauged and the product of the gauged length and square of the gauged diameter is compared with the product of length and squared diameter for a standard to determine the percent deviation of the volume. The percent deviation of the weight of each pellet from the weight of the standard is also determined. The percent deviation of density is determined by taking the difference between the percent deviation of volume and the percent deviation of weight.

That this difference yields the correct result may be understood from the following analysis:

Let $W$ = weight of standard
$V$ = volume of standard
$D$ = density of standard

Then $$D = \frac{W}{V}$$

$$D + \Delta D = \frac{W + \Delta W}{V + \Delta V}$$

where $\Delta$ indicates a small increment in D, W and V, respectively.

Let $\Delta D'$ = one-hundredth percent deviation of density = $\Delta D/D$
$\Delta V'$ = one-hundredth percent deviation of volume = $\Delta V/V$
$\Delta W'$ = one-hundredth percent deviation of weight = $\Delta W/W$ $$D\left(1 + \frac{\Delta D}{D}\right) = \left(\frac{1 + \frac{\Delta W}{W}}{1 + \frac{\Delta V}{V}}\right) \frac{W}{V}$$

$$1 + \frac{\Delta D}{D} = \frac{1 + \frac{\Delta W}{W}}{1 + \frac{\Delta V}{V}}$$

since $$\frac{W}{V} = D$$

$$1 + \Delta D' = \frac{1 + \Delta W'}{1 + \Delta V'}$$

$$\approx (1 + \Delta W')(1 - \Delta V')$$

Assuming $\Delta V'$ and $\Delta W'$ to be small $$1 + \Delta D' \approx 1 - \Delta V' + \Delta W'$$

$$\Delta D' \approx \Delta W' - \Delta V'$$

To achieve the desired precision the measurements are, in accordance with this invention, effected with the aid of linear variable differential transformers herein designated as LVDT's. Such a transformer usually includes a primary comprising a pair of oppositely connected windings, a secondary and a moveable core. The primary may be supplied with alternating current and the core is moveable by the measuring mechanism. With the core properly centered there is no doubt in the secondary; with the core displaced from the center, voltage dependent on the displacement is induced in the secondary. The measurement is effected by measuring or balancing the induced secondary voltage.

The pellets to which this invention is particularly applicable are small circular cylinders. In this case the determinative dimensions are the length and the diameter of each pellet.

In accordance with the specific aspects of this invention the length and diameter of each pellet are gauged by caliper-like elements connected to set the cores respectively of associated linear variable differential transformers. The output of the length LVDT is compared with the output of another LVDT and the difference balanced to zero by a servo motor operating on the core of the latter. This motor sets the length L on a suitable impedance, specifically a potentiometer. Similarly the output of the diameter LVDT is compared to the output of a fourth LVDT and balanced by another motor. The latter motor sets the diameter, D, on the diameter potentiometer and also sets potentiometers which measure respectively the LD and $LD^2$.

The analogue of $LD^2$ is compared to potential on a potentiometer which is set for the product of the length by the square of the diameter for a standard pellet; this measures the percent deviation of volume.

The weight as measured by a scale on which the movement of the weighing arm is measured by a fifth LVDT and is balanced out to give percent deviation of weight. The difference between the weight and volume deviation is then taken.

One of the important features of this invention is the use of the servo controlled potentiometers. These potentiometers over their whole range cover a small percentage of variation of the length and diameter respectively; 5% is typical. These potentiometers thus are set to accurate analogues of the actual length or diameter. Typically the length potentiometer at one extreme measures 110% of the standard length and at the other 90% of the standard. An error of 2.5% of the range on either side of the setting of the potentiometer would be an error of only .25% in the length measurement.

In accordance with a further specific aspect of this invention provisions are made to reject pellets the dimensional parameters of which fall outside of the set limits of contact making meters; these limits must not exceed the limits (for example 110%–90%) of the computer potentiometers. Memory switch means is provided which is actuable for any parameter which falls outside of the range limits of the corresponding meter. Responsive to the actuation of this switch means pellets having one or more parameters falling outside of these limits are rejected. In the practice of this invention it is essential that the set range limits of the contact making meters be consisent with industrial demands. The limits for length and diameter should be set so that the pellets falling outside of the limits are undesirable for reactor use solely because they fall outside of one or the other limits (have too great or too small a diameter or length) regardless of whether or not the density of such pellets may fall within the standards demanded. To achieve this purpose the limits are usually different for different parameters. The volume, weight and density limits are correspondingly set.

In a typical situation in apparatus which was constructed and found to operate satisfactorily and in which the density of the pellets were maintained to plus or minus 2½% and the weight to plus or minus 10% the corresponding computer potentiometer had a range over the following limits:

Diameter of pellet—plus or minus 2½% of standard
Length of pellet—plus or minus 10% of standard
Volume of pellet—plus or minus 25% of standard It is essential for economy reasons that the processing of the pellets be automated to the extent practicable and this is achieved in accordance with a further aspect of this invention by a processing system for automatically advancing, gauging, weighing and selecting the pellets. An important inventive feature of this system are the provisions which it includes to prevent improper turning of the pellets as they advance.

The pellets are usually small elongated cylinders (but may have other forms, for example, cubical) and are delivered by a conveyor belt provided with suitable guides so that the axes of the pellets are maintiined parallel to the direction of advance. The gauging and weighing mechanisms are aligned at right angles to the direction of advance and an indexing mechanism is provided to move each pellet in its turn into the gauging station. The pellets are moved into the gauging station with their axes at right angles to their direction of movement. The gauge has a caliper which is normally held in gauging position; that is, with its moveable jaw set to be pushed back to correspond to the length of the pellet which is injected between the jaws. This moveable jaw is connected to the length LVDT. The gauge also has a caliper with a moveable jaw above the station in engagement with which the pellet is injected when it is moved into the gauging station. This caliper is connected to the diameter LVDT.

When a pellet has been gauged the indexing mechanism imparts an impact to it causing it to roll down a channel or guide into a weighing-scale pan at a lower level than the gauge. A feature of this invention in its specific aspects is that this guide is concaved upwardly forming a groove in the form of a cylindrical arc along which the pellet rolls. The concavity prevents the pellet from turning.

An ejector is provided which extends into the pan and moves the pellet either into an accept channel or a reject channel depending on its properties. The ejector is normally set to operate to accept each pellet at the end of the weighing operation. Reject operation is produced responsive to a memory mechanism which operates for deviation of a pellet from the standard in critical properties. Usually a pellet is rejected if its diameter or length deviates from standard by certain magnitudes (up to ±2½ and ±10% respectively in the example given above) or its density deviates from the standard by a certain magnitude (±2½% for example).

The novel features considered characteristic of this invention are discussed generally above. The invention in detail, both as to its organization and as to its method of operation, together with the objects and advantages thereof, will be understood from the following description of specific embodiments of this invention taken in connection with the accompanying drawings, in which:

FIG. 1 shows the components of the apparatus according to this invention as blocks. The broken line arrows between the blocks present the mechanical movement of the pellets; the full-line arrows the flow of electrical information.

The pellets PE (FIG. 2) are delivered by a Pellet Delivery Conveyor to the Gauging Unit where the diameter, D, and the length, L, are measured and $LD^2$ is computed. From the Gauging Unit the pellets are delivered to a Weighing Unit where each pellet is weighed. From the Weighing Unit each pellet is transferred either to an Accept channel or to a Reject channel depending on the operation of the Ejector Unit.

The Ejector Unit operates on each pellet after the weighing operation and its operation depends on the electrical information which it receives. The Gauging Unit sets the Ejector Unit to reject, through information channels L or D if L or D respectively exceed preset limits. In addition the Gauging Unit sends the product $LD^2$ for each pellet to the Volume Deviation Unit where the product is compared with the similar product for a standard. The volume deviation $\Delta LD^2$ thus derived is transmitted to the Density Deviation Unit.

The operation in the Weighing Unit leads to the transfer of weight information for each pellet to the Weight Deviation Unit which transfers the weight deviation $\Delta W$ to the Density Deviation Unit. The latter calculates the density deviation, $\Delta W - \Delta LD^2$, and transfers information to the Ejector Unit if the density deviation exceeds preset limits.

If the Ejector Unit receives no information of exceeded limits for length, diameter or density deviations it ejects the pellet into the Accept Channel; if the Ejector Unit receives information that L, D or $\Delta W - \Delta LD^2$ exceed preset limits, it ejects the pellet into the Reject Channel. The sequencing of the mechanisms which move the pellets PE through the Gauging Unit and Weighing Unit and which operate the Ejector Unit at the proper time is controlled by the Program Unit. The Program Unit also operates to prevent the jamming of the pellets PE in the Gauging Unit.

The Pellet Delivery Conveyor (FIG. 2) includes a continuous belt 21 for moving the pellets PE to a position where they are advanced to the Gauging Unit and an indexing mechanism 23 for advancing them into the Gauging Unit from this position. The belt 21 is driven from a motor MO1 (FIG. 7) through pulley 25 (FIGS. 4 and 10) at one end of its path and passes over pulley 27 (FIG. 2) at the other end of its path.

The belt 21 is moved over the top 29 of a table 31. The pulleys 25 and 27 are rotatably supported on horizontal bearings (not shown) from a plate 33 secured to the angle-bracket legs 35 of the table on one side. The pulley 25 is below an opening 37 in the top 29 of the table 31 and the pulley 27 is beyond the end of the top 29. The pulleys 25 and 27 are so positioned that the belt 21 is moved just above the top 29.

Strips 39 extend parallel along the path of the belt 21. The distance between the inner edges of the strips 39 is just greater than the width of the belt 21 so that the belt moves freely between them. Rails 41 are secured (for example by welding) to the strips so that they overhang the strips and extend over the belt 21. The pellets PE move in direction parallel to their long dimensions (axis) and the rails 41 serve the double purpose of holding down the belt and aligning the pellets PE.

The Gauging Unit communicates with the belt 21 through an entrance or channel 43 (FIG. 4) along with the pellet PE is moved at right angles to its motion along the belt. At the entrance 43 a stop assembly 45 is provided just over the belt 21. This assembly includes a bar 47 of insulating material generally at right angles to the belt 21 and extending over the belt. An angle 49 of insulating material extends over the end of the bar 47 over the belt 21 overhanging the bar 47 at the end remote from the pellet channel 43. A spring 51 is mounted along the side of the bar 47 remote from the pellet channel 43. This spring 51 is the operating member of a switch SW1 (FIGS. 2 and 7) which is actuable by each pellet PE as it approaches the entrance 43.

The spring 51 extends over the belt 21 opposite an opening 53 in the bar 47 and carries a pin 55 (FIG. 4) which extends through the opening 53 and is actuable by each pellet PE as it is advanced to a position opposite channel 43. The spring 51 also carries a contact tip 57 adapted to engage a cooperative contact 59 (FIG. 2) when the spring 51 is actuated by a pellet PE. The tip 57 and the contact 59 together constitute switch SW1. The closing of the switch SW1 by a pellet signals that a pellet is in a position to be injected into the Gauging Unit.

Figure 1:
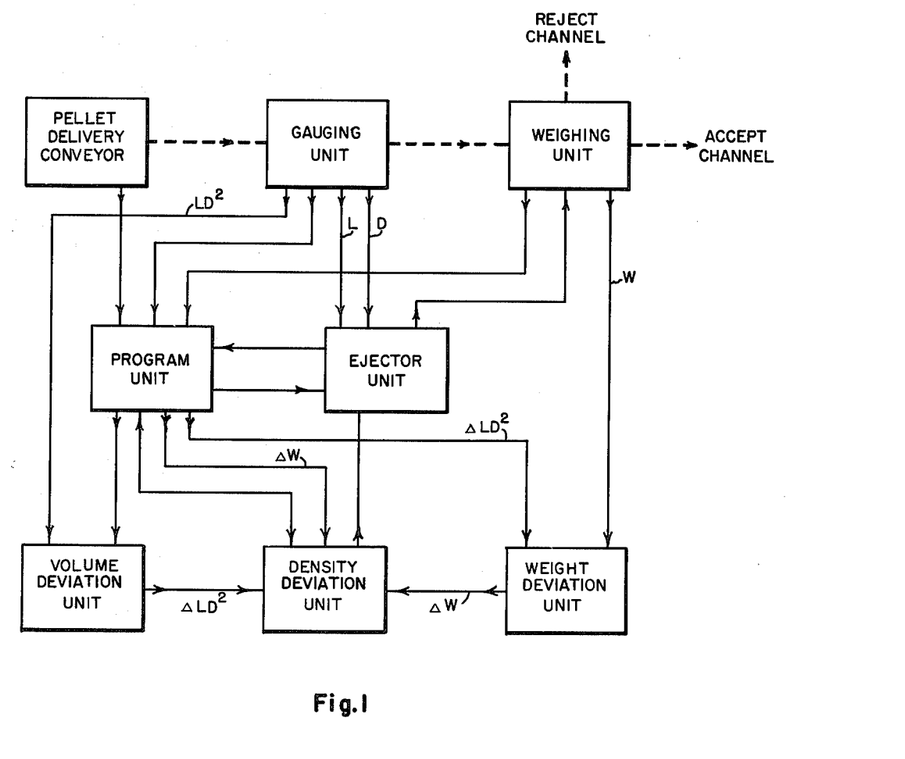
FIGURE 1 is a block diagram showing the principal components of apparatus according to this invention and with which this invention is practiced and their mechanical and electrical relationship.
Figure 2:
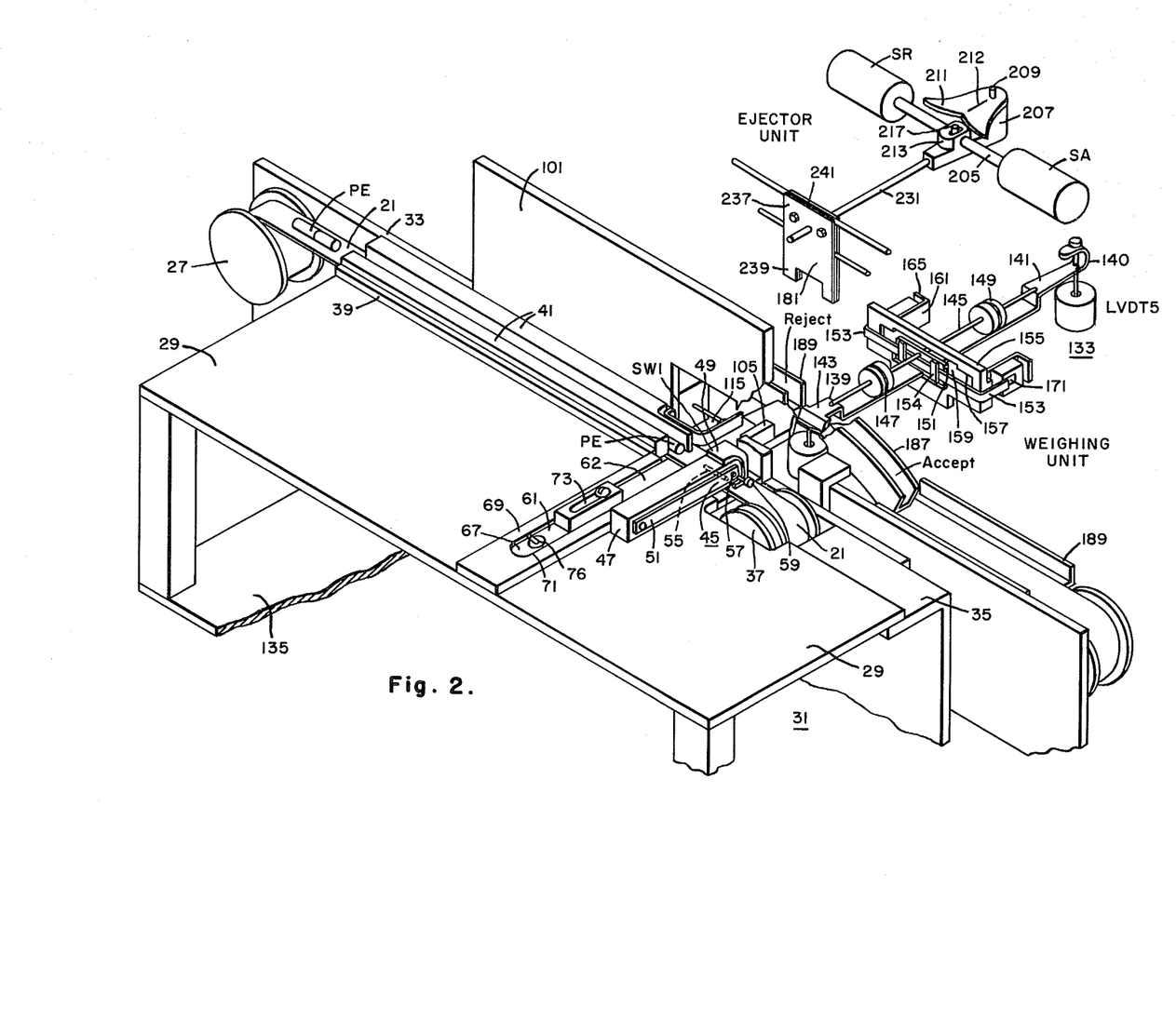
FIG. 2 is a view in isometric partly exploded of the classifying apparatus according to this invention and used in the practice of this invention.
Figures 3, 10:
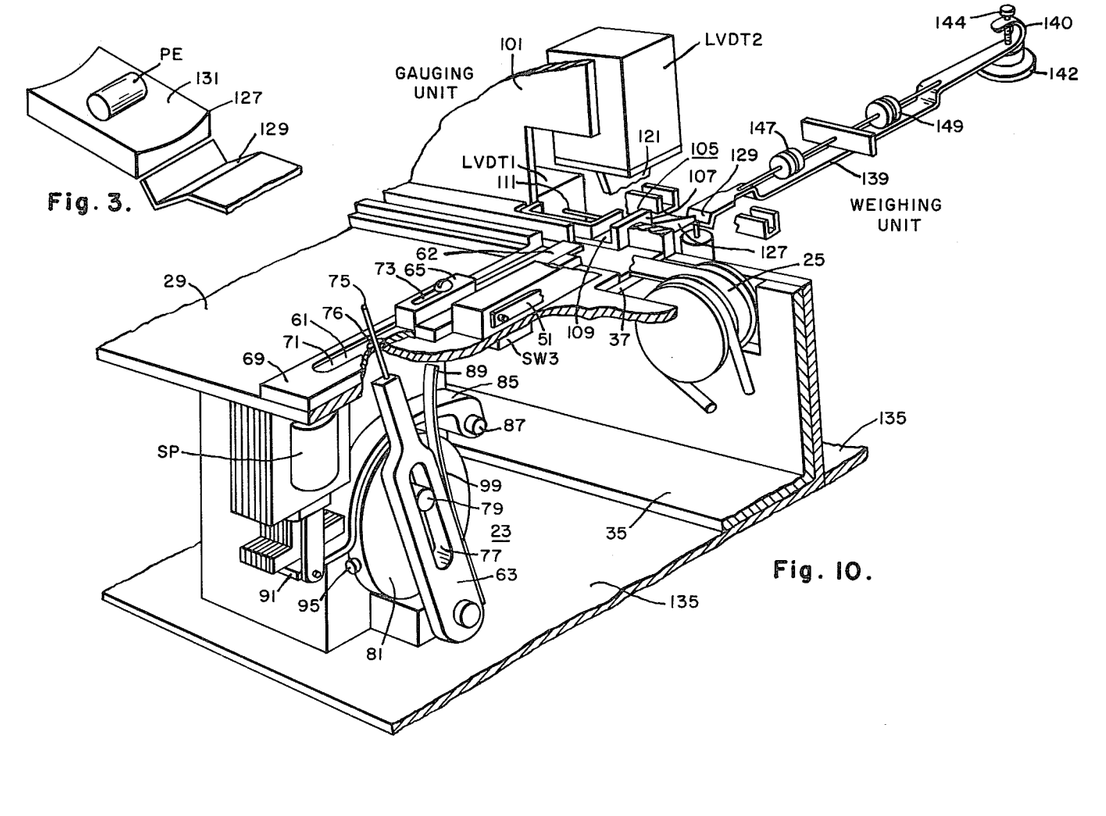
FIG. 3 is a fragmental view showing the channel between the Gauging Unit and the Weighing Unit of the apparatus shown in FIG. 2.
FIG. 10 is a view in isometric of the apparatus of FIG. 1 showing the mechanism for advancing the pellets into the Gauging Unit and into the Weighing Unit.
Figures 7, 8, 11:
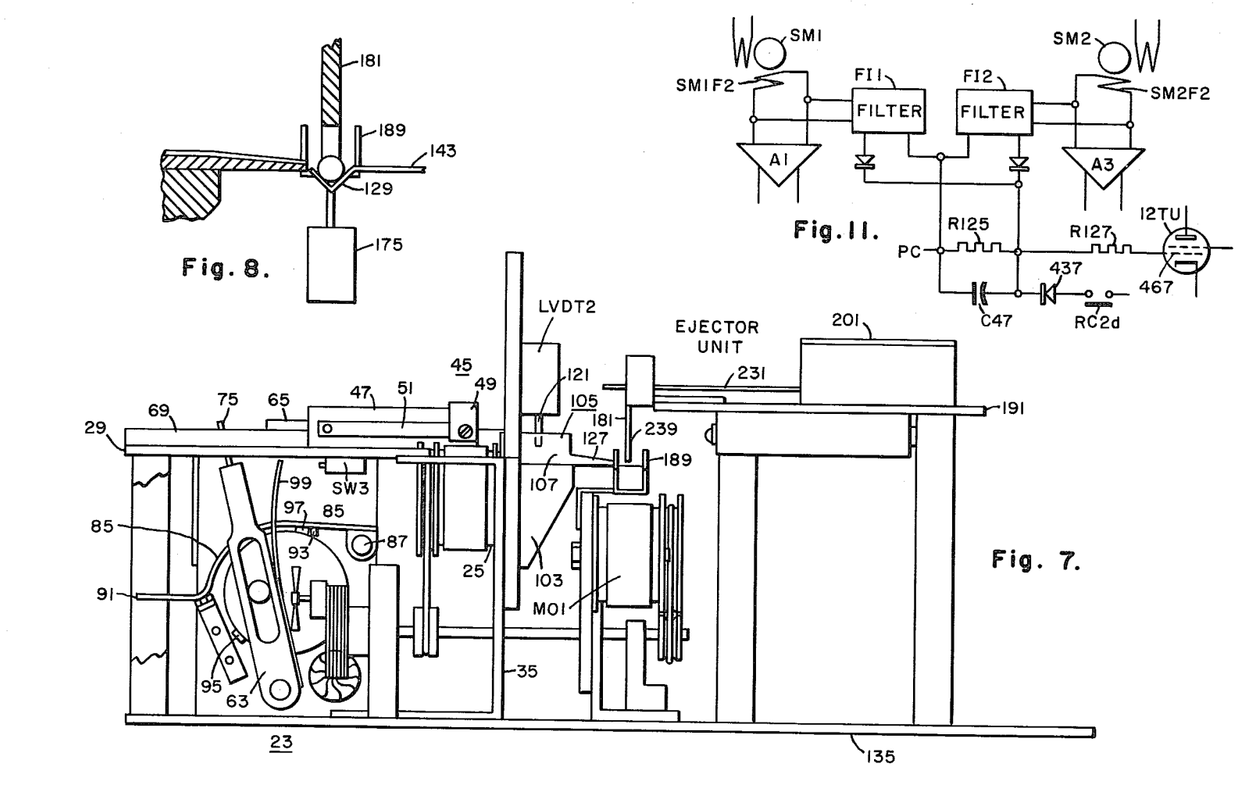
FIG. 7 is a view in end evaluation of the apparatus shown in FIG. 2.
FIG. 8 is a fragmental view in side elevation showing the scale pan of the Weighing Unit and its associated balancing coil.
FIG. 11 is a fragmental view showing a modification of this invention.

The indexing mechanism 23 (FIG. 2) includes a slider 61 which is reciprocated from a scotch yoke 63 (FIGS. 7 and 10). The slider 61 is adjustably secured to a pusher plate 62 from which a slotted block 65 extends integrally. The slider 61 is slideable on top 29 in a track (not shown) in elongated slotted guide 69. The block 65 extends through the slot 71 of guide 69. The pusher 62 extends from block 65 along the slot 71 into entrance or channel 43 in a position such as to advance each pellet which actuates SW1 into the Gauging Unit. The position of the end of pusher 62 in the entrance 43 may be set by securing the block 65 at the proper position along the slot 73 to the slider 61.

The slider 61 (FIGS. 2 and 10) is driven from the yoke 63 through a pin 75 extending from the yoke 63 and engaging the plate 67 through a suitable low friction fiber (Teflon or nylon) washer 76. The yoke 63 has a slot 77 and is reciprocable by a pin 79 extending eccentrically from a disc 81 rotated by a motor MO2 (FIGS. 7, 10 and 11A) through a slip clutch 83.

The indexing mechanism 23 also includes a pawl 85 (FIG. 10) suspended to pivot about a pin 87 by which it is secured to a plate 89 extending downwardly from top 29. The other end of the pawl 85 has a lip 91 linked to an armature actuable by pawl solenoid SP (FIGS. 7 and 10) extending downwardly from the top 29. The pawl 85 has a stop 93 intermediate the pivot 87 and the lip 91 which is adapted to engage pins 95 and 97 displaced along the rim of the disc 81. With solenoid SP deenergized the pawl 85 drops downwardly under gravity so that the stop 93 then engages pin 95 or 97. In this position of the mechanism 23 the motor MO2 rotates but the clutch 83 slides.

Figure 11A:
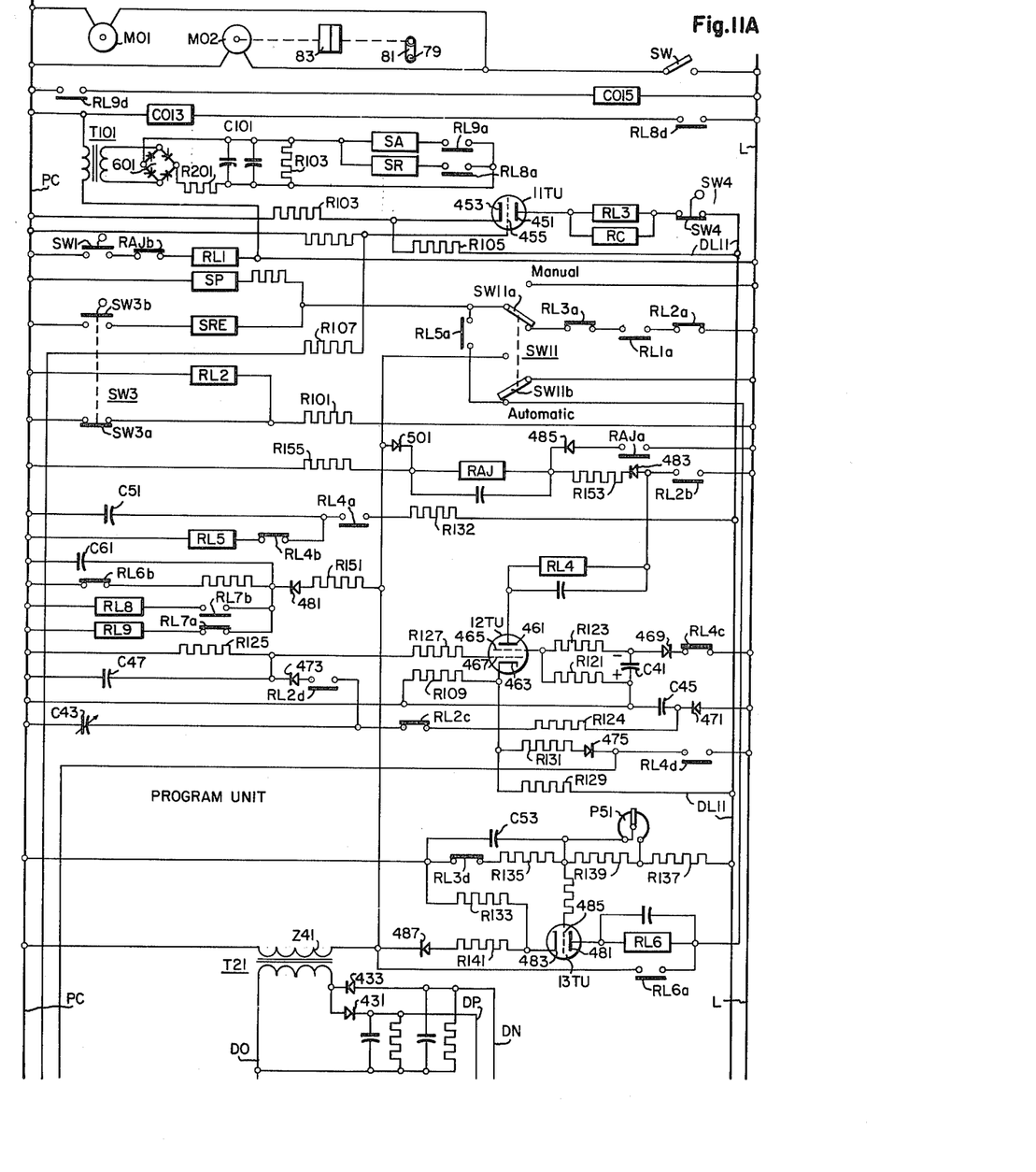
FIGS. 11A, 11B, 11C together constitute a schematic showing the electrical circuit of the apparatus according of this invention; and In FIGS. 1 through 11C this invention is illustrated as applied to the processing of generally cylindrical fuel pellets for nuclear reactors.

The yoke 63 carries a spring 99 which in the forward position of the yoke 63 actuates a limit switch SW3 (FIG. 7) suspended from the underside of the top 29. The limit switch SW3 has a back contact SW3a and a front contact SW3b (FIG. 11A). The yoke 63 reciprocates the pusher 62.

The yoke 63 has an initial or standby position at which pin 97 engages the stop 93 (as in FIG. 7) and an advanced position in which the pin 95 engages the stop 93. In the operation of the apparatus the solenoid SP is instantaneously actuated on two occasions during the processing of each pellet. The first actuation releases pin 97 from stop 93 permitting the yoke 63 to cause pusher 62 to move the pellet PE into the Gauging Unit. SP is immediately deenergized after this actuation so that pawl 85 drops down causing pin 95 to be engaged by stop 93. The pusher 62 remains adjacent the pellet PE in the Gauging Unit until the second actuation of solenoid SP. This releases pin 95 resetting the yoke 63 to the initial position. During its motion to the initial position the yoke moves pusher 62 forward so that it pushes the pellet PE out of the Gauging Unit into the Weighing Unit and then returns the pusher 62 to the initial position. The switch SW3 is actuated in the advanced position of the yoke and this operation results in the opening of SW3a and the closing of SW3b (FIG. 11A).

The Gauging Unit is supported from vertical plate 101 secured to the channel 35 which serves as support for the top 29 and from a triangular plate 103 (FIG. 7) secured at right angles to the vertical plate.

Figure 4:
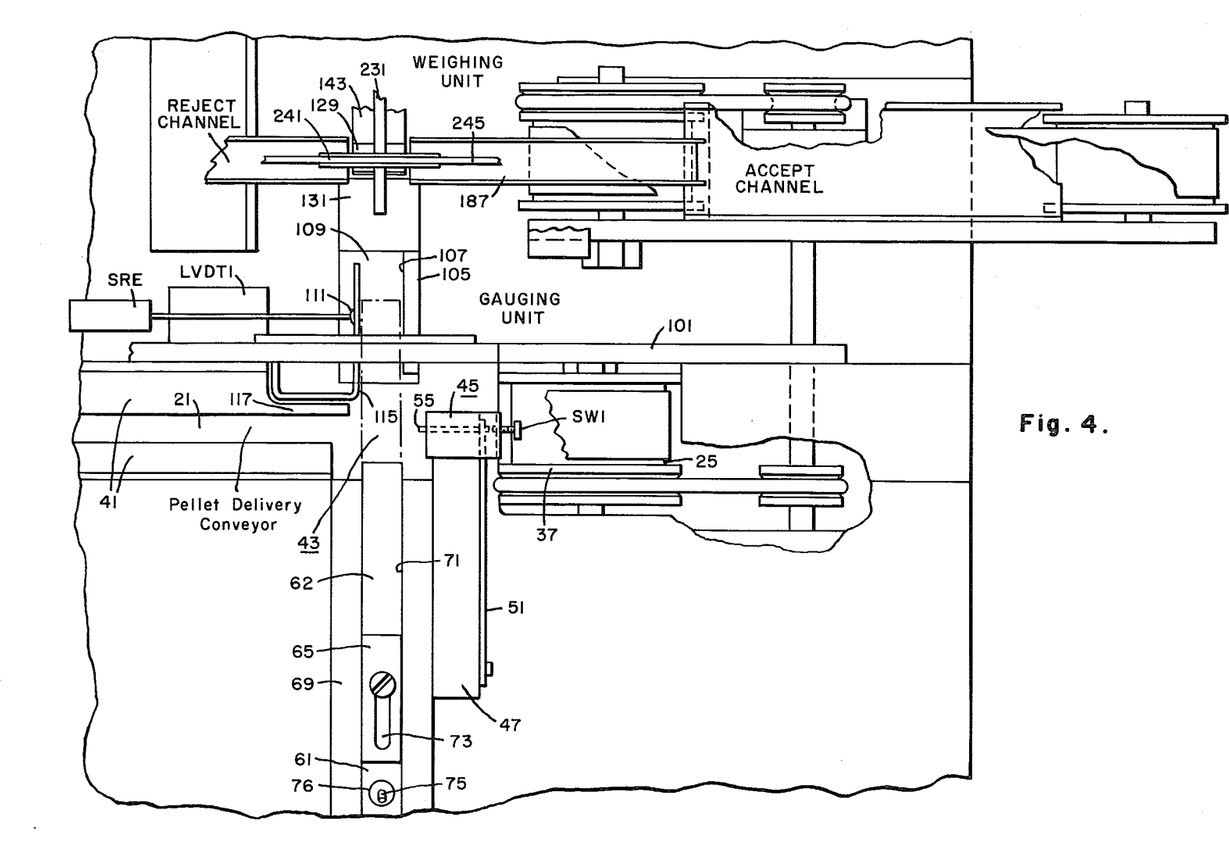
FIG. 4 is a view in top elevation of the apparatus shown in FIG. 2.
Figure 11B:
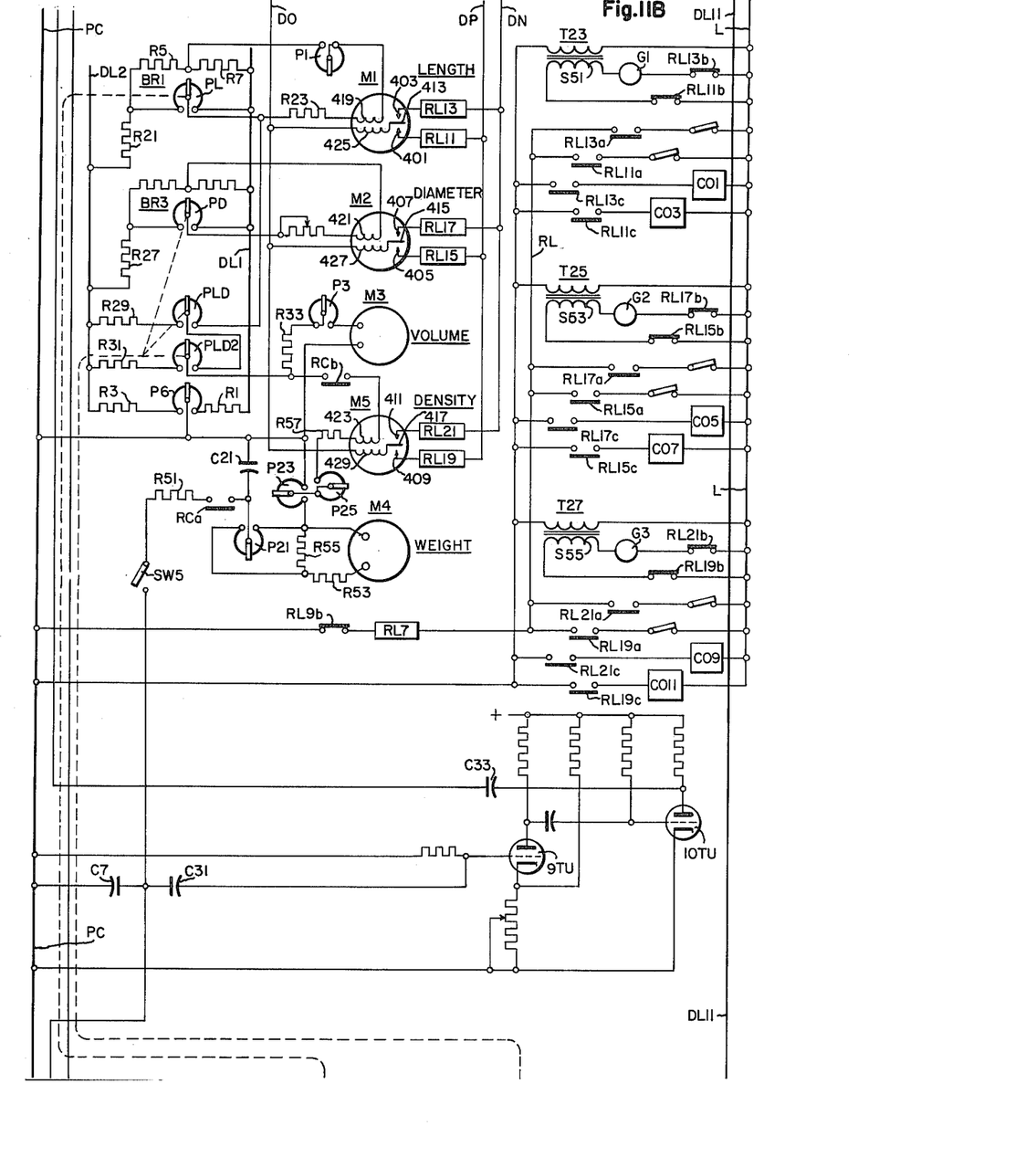
Figure 11C:
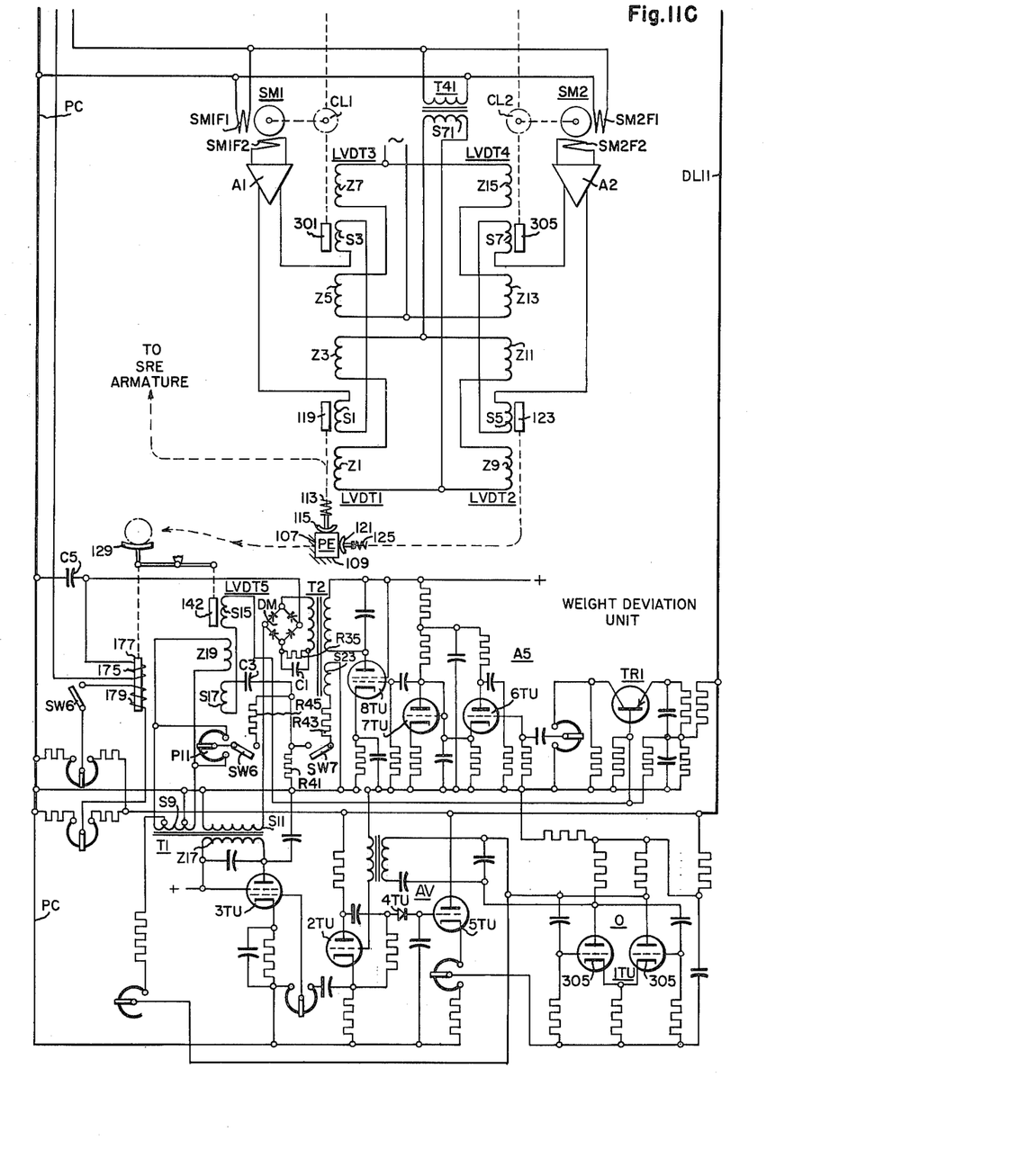

The gauging is carried out with the pellet PE on an angle plate 105 of stainless steel supported on the plate 103. A pellet PE in gauge is urged against the vertical wall 107 of the plate 105 in measuring the length and against the base 109 in measuring the diameter. The surface of the base 109 is coextensive with the belt 21 at the entrance channel 43 (FIG. 4). The length of each pellet PE is gauged with the aid of LVDT1 which is mounted on plate 101 opposite the wall 107. The length feeler 111 extends over base 109 from LVDT1 in a direction perpendicular to the surface 107 and is urged towards this surface by a spring 113 (FIG. 11C). The tip of this feeler 111 operates through a rectangular leaf spring 115 (FIGS. 2 and 4) which is suspended from the support for LVDT1. The feeler 111 is connected to the core 119 of LVDT1. A solenoiod SRE (FIGS. 4 and 11A) is connected to feeler 111 to retract this feeler when the pellet PE is to be ejected from the Gauging Unit.

The diameter is gauged with the aid of LVDT2 which is mounted on plate 101 directly over the center portion of base 109. The diameter feeler 121 (FIG. 10) is connected to the core 123 of LVDT2 and is urged in a direction perpendicular to the surface of 109 by a spring 125.

Between gauging operations the feeler 121 is set so that its distance from surface 109 is just smaller than the diameter of diameter pellet PE. Also, at all times, except when the pellet is being ejected from the Gauging Unit, the retract solenoid SRE is deenergized and the feeler 111 is set so that the tip of spring 115 is spaced from surface 107 a distance just shorter than the length of the shortest pellet PE. During operation a pellet PE is thrust between the spring 115 and surface 107 and feeler 121 and surface 109 by pusher 62. After the gauging operation the feeler 111 is retracted so that when the pusher 62 pushes the pellet PE out of gauge into the weighing pan 129 of the Weighing Unit the pellet PE is not deflected. The pan 129 is in the form of a V groove and the channel 127 has a generally concave surface 131 (FIG. 3) forming a cylindrical concavity, the axis of which is generally perpendicular to the long dimension of the pan 129. The pellet PE thus moves along the channel 127 into the pan 129 without being turned.

Figures 9, 9A, 9B:
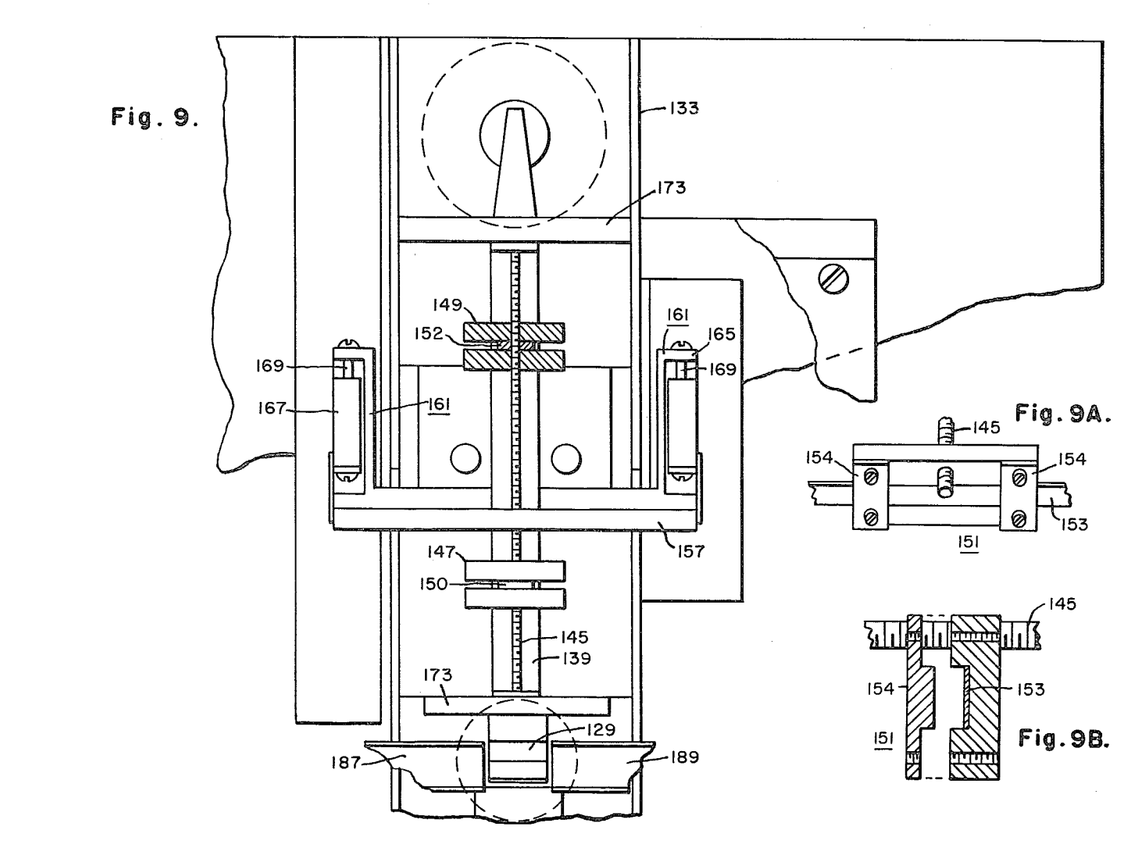
FIG. 9 is a view in top elevation of the weighing scale of the apparatus shown in FIG. 2.
FIGS. 9A and 9B are fragmental views showing details of the Weighing Unit.

The Weighing Unit (FIG. 9) is mounted between the flanges on one side of an I-beam 133 supported on the lower plate or deck 135 of the table 31. The Weighing Unit includes a generally channel shaped strip 139, the ends of which are bent to form the pan 129 at one end and a rigid generally U-shaped connection 140 to the core 142 of LVDT5 (FIGS. 2 and 11C) through a screw 144 at the other end. A threaded rod or arm 145 extends between the bent up ends of the strip 139. The arm 145 carries weights 147 and 149 on both sides. These weights may be set along the rod 145 for balancing. Each pair of weights 147 and 149 is separated by a resilient washer 150 and 152.

The rod 145 passes through a plate 151 centrally at the upper rim of the plate and is secured to this plate 151 (FIG. 2). The plate 151 serves to support the pivot bearing of the beam 139 which is a band 153 of stainless steel or other metal (about .005 inch thick), engaging the plate 151 in a longitudinal groove and secured to the plate 151 by straps 154 secured to the plate across the ends of the groove.

The beam support is a generally U-shaped bracket 155 having a vertical center portion 157 with a window 159 (FIG. 2) and having legs 161 with bent-over feet or lips 165. The center portion 157 is secured to the web of the I-beam 133 so that it is vertical. The fastening means (not shown) is such as to minimize distortion of the beam 139 from thermal expansion. The legs 161 extend cantilever fashion from the center 157. The beam support also includes stirrups 167 in the form of blocks. Each stirrup 167 is seated in leg 161 adjacent the associated lip 165 and is moveable along the leg by a screw 169 which passes through the associated lip 165 and screws into the stirrup. Each stirrup 167 also has a hole 171 (FIG. 2) near the end adjacent the center 157. The band 153 wraps around the rounded edges of the center 157 of the bracket 155, passes through the holes 171 and is secured to the ends of the stirrups 167 adjacent the center 157. The band 153 is tensioned by moving the stirrups towards the lips 165. The plate 151 is free to pivot about its longitudinal axis in the window 159 as the beam 139 deflects and the band 153 is thus torsioned by the deflection of the beam and serves as a highly effective scale bearing. The torsion is very small; about 6 minutes. The deflection of the beam 137 is limited by yokes 173 which extend over the beam 139 near the ends where the beam is bent.

The weighing is effected by balancing the scale. For this purpose a balancing coil 175 (FIGS. 8 and 11C) is provided to reset the pan 129 to the balanced position. The coil 175 acts on a permanent-magnet core 177 connected to the pan 129. A trimming coil 179 is also coupled to the core 177 for precise setting. The trimming coil 179 and balancing coil 175 are mounted in the web of the I-beam 133 just under the pan 129 and the core 177 extends from the center of the pan 129 through the coils 175 and 179.

Figure 5:
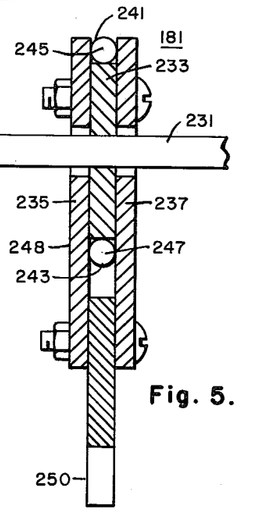
FIG. 5 is a fragmental view in section showing the flipper of the Ejector Unit.
Figure 6:
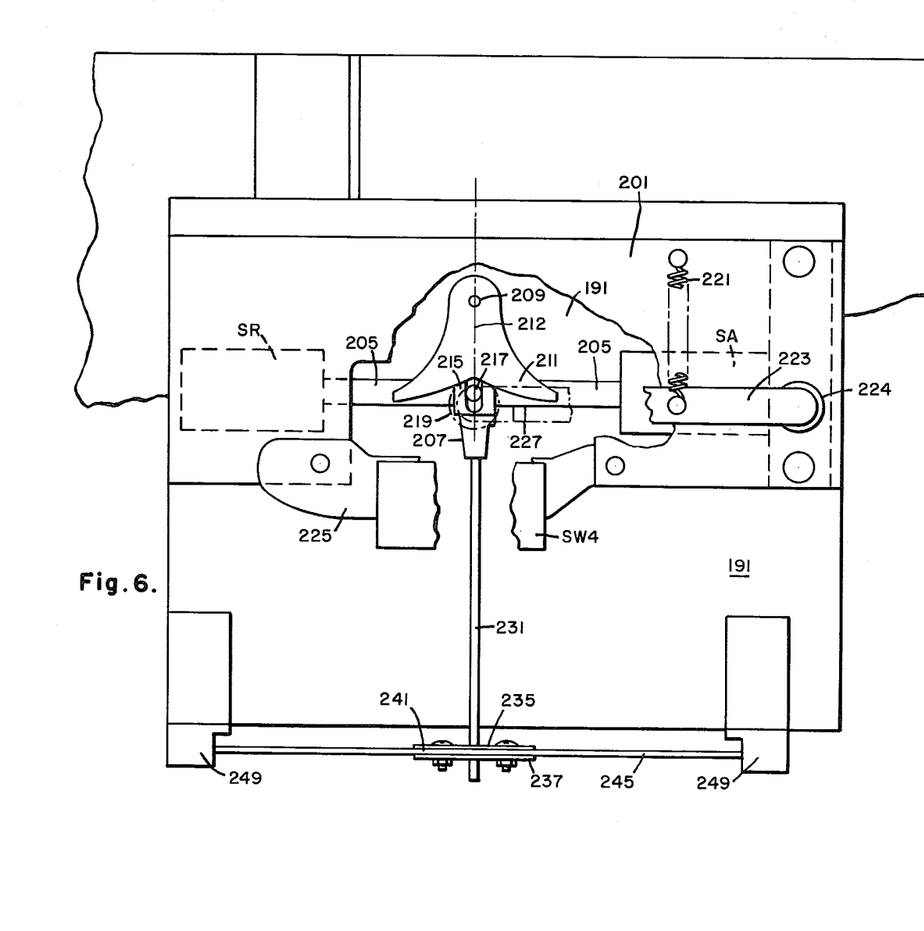
FIG. 6 is a view in top elevation of the Ejector Unit of the apparatus shown in FIG. 2.

The pellets PE are ejected from the pan 129 along the Accept or Reject Channels by operation of the flipper 181 of the Ejector Unit (FIGS. 2, 5, 6) in one direction or the other. The Accept Channel includes a guide 187 communicating with the pan 129 along which the accepted pellets PE move and the Reject Channel includes a like guide 189.

The Ejector Unit is supported on a table 191 itself mounted on the plate 135 of table 31. This unit includes accept solenoid SA and reject solenoid SR (FIGS. 6, 11A) which are mounted between plates 201 and 191. The solenoids SR and SA have a common plunger 205 which is displaceable in one direction or the other on energization of one of the solenoids.

The Ejector Unit also includes a bracket 207 pivotally supported on a pin 209 between the plates 201 and 191 and having thereon a double cam 211, the cam surfaces of which are symmetrical with respect to the axis 212 through the center of pivot at pin 209. The plunger 205 has a slotted block 213, the slot 215 of which is engaged by a pin 217 extending from the cam bracket 207.

The cam 211 is resiliently held centered along the axis 212 by a roller 219 which is urged against the joint between the cam surfaces by spring 221 acting on a pivotally mounted bar or arm 223 on the free end of which the roller 219 is mounted. The arm 223 is resiliently pivoted in a rubber tube 224. Energization of one of the solenoids SA or SR causes the cam 211 to pivot against the force of the spring 221. When this solenoid is deenergized the cam 211 is again centered by the roller 219.

A limit switch SW4 (FIGS. 6 and 11A) is suspended from arm 225 connected to plate 201. This switch SW4 has a normally closed (front) contact which is actuable by button 227 on arm 223 to open when the cam 211 is pivoted in either direction. The opening of the contact of limit switch SW4 signals the end of a processing operation for a pellet PE and resets the apparatus for processing the next pellet.

A drive rod 231 (FIG. 6) extends from the bracket 207. This rod 231 is connected to the flipper 181 (FIGS. 5 and 6) to move the flipper to deposit a pellet PE from the pan 129 in the Accept Channel or Reject Channel depending on whether the accept solenoid SA or the reject solenoid SR is actuated.

The flipper 181 (FIGS. 5 and 6) is of composite structure and is made up of a center plate 233 on each side of which there is a plate 235 and 237, respectively. The rod 231 engages the center plate 233 substantially at its center and passes through clearance holes in the outside plates. The outside plates 235 and 237 extend above and below the center plate 233 forming channels. The channels are engaged by guide rods 245 and 247 on which they ride. The plates 235 and 237 extend below the rod 247 and hold a strip 248 of rubber (neoprene) having fingers 250 at its tip. The fingers 250 extend into the pan 129 so as to eject a pellet PE in the pan when rod 231 is moved. Brushes (not shown) may be attached to the tips of the fingers 250 to clear the pan 129 of chips.

The Volume Deviation Unit includes potentiometer PL (FIG. 11B) for setting an analogue of the length of the pellet PE, potentiometer PD for setting an analogue of the diameter, and potentiometers PLD and PLD$^2$ for computing an analogue of the volume. These potentiometers are connected to be supplied with direct-current voltage of the order of 25 volts between conductors or buses DL1 and DL2. In normal operation this supply draws about 400 milliamperes and is regulated to $\pm.05\%$. An intermediate electrical point of this supply is grounded. This point is determined by a voltage divider including resistors R1 and R3 between which potentiometer P6 is interposed.

The length potentiometer PL is connected in a bridge network BR1 including resistors R5 and R7 and the branches of PL. This network BR1 is connected between DL1 and DL2 through a resistor R21. The output conjugate terminals of the network BR1 are the adjustable arm of PL and the junction of R5 and R7. These terminals are connected across a meter M1 through a fixed resistor R23 and a potentiometer P1.

The arm of PL is controlled by a cam CL1 rotatable by a servo motor SM1 (FIG. 11C). The motor SM1 has fields SM1F1 and SM1F2. Field SM1F1 is controlled from the Program Unit and is supplied during the gauging interval through contact RL4$d$ of delay relay RL4. Field SM1F2 is supplied with an unbalance during a gauging operation. To compensate for the unbalance the Volume Deviation Unit includes LVDT3.

The primaries Z1 and Z3 of LVDT1 are supplied with an alternating potential from the same supply as SM1F1 through transformer T41, the secondary S71 of which typically supplies about six volts to Z1 and Z3. The primaries Z5 and Z7 are continuously supplied from the available supply usually through a transformer (not shown). LVDT1 is thus energized only during the gauging interval. The secondaries S1 and S3 are connected in series bucking relationship to the input of an amplifier A1. The output of this amplifier A1 is connected to supply field SM1F2. The core 301 of LVDT3 is connected to be controlled by cam CL1 together with the arm of PL.

LVDT1 is set by a factory or service adjustment so that the bridge BR1 in which PL is connected is balanced for a pellet PE of standard length. When a pellet of nonstandard length is in gauge the potential of PL with respect to ground is negative if the length is less than standard and positive if it is higher than standard. The meter M1 measures the length deviation. An important feature of this invention is the selection of R21 so that PL over its whole range covers only that deviation of length which is acceptable. In a specific situation the setting of PL at its most negative point corresponds to 90% of standard length and the setting of PL at its most positive point corresponds to 110% of standard length.

The diameter potentiometer PD is connected in a network BR3 similar to BR1 and the output conjugate terminals of the network BR3 are likewise connected to a meter M2. The bridge BR3 is supplied from DL1 and DL2 through a resistor R27. The setting of PD at its most negative point corresponds to 97½% of standard diameter and the setting of PD at its most positive point corresponds to 102½% of standard diameter. Bridge BR3 is balanced for standard diameter. The meter M2 measures the diameter deviation.

Potentiometer PLD (FIG. 11B) is connected through a resistor R29 between the arm of PL and DL2, and PLD$^2$ through a resistor R31 between the arm of PLD and DL2. The arms of PD, PLD and PLD$^2$ are operable together from a cam CL2 rotatable by motor SM2 which has fields SM2F1 and SM2F2 (FIG. 11C).

The Volume Deviation Unit includes LVDT4. The primaries Z9 and Z11 of LVDT2 are connected to be supplied in parallel with primaries Z1 and Z3 and the primaries Z13 and Z15 of LVDT4 are connected to be supplied in parallel with Z5 and Z7 from the alternating supply. The secondaries S5 and S7 are connected in series bucking to the input of amplifier A3. The output of amplifier A3 supplies field SM2F2. The core 305 of LVDT4 is connected to cam CL2 to be positioned with the arms PD, PLD, PLD$^2$. With BR1 and BR2 balanced, PLD$^2$ produces the voltage analogue of standard volume.

The potential on the arm of PLD$^2$ is balanced against the voltage deriveable between the arm of P6 and ground (FIG. 11B). The arm of P6 is connected to the arm of PLD$^2$ through meter M3, a potentiometer P3 and a resistor R33. P6 is set so that when PLD$^2$ is at standard volume the potential between PLD$^2$ and ground is zero. The meter M3 measures volume deviation.

The Weight Deviation Unit includes an audio frequency power supply and an amplifier A5 (FIG. 11C). The audio frequency is about 2000 cycles per second and is derived from a suitable oscillator O including double triode 1TU. The output of the oscillator O is connected to the input of a cathode-follower including tube 2TU; the output of the cathode-follower controls a power pentode 3TU. The power pentode 3TU feeds the supply transformer T1 having primary Z17 and secondaries S9 and S11. The supply includes an automatic volume control circuit AV which includes diode 4TU and triode 5TU. Triode 5TU controls the level of the cathodes 305 of 1TU. 5TU and 2TU may be a double triode.

The amplifier A5 includes a low-impedance-input amplifier circuit including transistor TR1. The output of this circuit is amplified by cascade amplifier including tubes 6TU and 7TU and power pentode 8TU.

The Weight Deviation Unit also includes a demodulator DM. Opposite conjugate terminals of demodulator DM are supplied through a network including a capacitor C1 and a resistor R35 from the secondary S13 of the output transformer T2 of amplifier A5. The other opposite conjugate terminals are supplied from secondary S11 of transformer T1. The primary Z19 of LVDT5 is supplied from the secondary S9 of T1. The primary is loaded by P11. The secondaries S15 and S17 are connected bucking to the input of amplifier A5 through DC blocking capacitor C3 and through a feedback resistor R41. R41 is adapted to be supplied from feedback secondary S23 of transformer T2 through a resistor R43 and switch SW7. With switch SW7 closed negative stabilizing feedback is injected into the input circuit of A5. Such feedback is used ordinarily when the scale is used alone; when the scale is used in the complete system SW7 is open. Alternating current from P11 is also injected through SW6 and R45 to counteract spurious current.

The output of DM produces a potential which in polarity and magnitude is dependent on the phase and amplitude of the output of A5. Thus the output of DM is a direct-current potential which in amplitude measures the extent of the displacement of the core 142 and in polarity indicates the direction of displacement from an initial setting.

When the pellet PE drops into the pan 129 a sharp impulse is produced on the weighing mechanism. Such an impulse would tend to cause hunting of the weighing mechanism. An important feature of this invention is the impressing on the weighing coil 175 (FIG. 11C) from DM of a damping impulse which suppresses the hunting. This damping impulse is short but of very high amplitude compared to the impulse impressed by the pellet PE; the ratio being of the order of 1,000,000 to 1. The power pentodes 3TU and 8TU would tend to produce instantaneous power of this relative magnitude.

The output of DM is adapted to be connected to the adjustable arm of a potentiometer P21 through the weighing coil 175, the switch SW5, a resistor R51 and a front contact RCa of a comparison relay RC in the Program Unit (FIG. 11B). The potentiometer P21 is connected to ground through potentiometer P23 and is also connected across the weight-deviation meter M4 through a resistor R53. P21 is shunted by a resistor R55. A filtering capacitor C21 is connected between the arm of P21 and ground.

The density deviation meter M5 is connected to measure the potential between the arm of P23 and the arm of PLD². This connection includes front contact RCb of relay RC, the meter M5, a fixed resistor R57 and a variable resistor or potentiometer P25. This potential is the analogue of the difference between the weight deviation and the volume deviation and is the density deviation.

The impact which the pellet PE produces as it drops into the pan 129 serves to produce an electrical impulse. This electrical impulse controls the activating of the Program Unit to produce the processing of the pellet PE following its weighing. To derive the impulse the potential pulse produced at weighing coil 175 when the pellet PE drops into the pan 129 is impressed through coupling capacitor C31 in the input of a cascade amplifier which includes tubes 9TU and 10 TU (FIG. 11B). These tubes may be parts of a double triode. The output of this amplifier is impressed through capacitor C33 in the grid circuit of the scale thyratron 11TU (FIG. 11A) in the Program Unit rendering the latter conducting and actuating the scale relay RL3 and the compare relay RC.

The meters M1, M2 and M5 have limit contacts 401 and 403, 405 and 407, and 409 and 411, respectively (FIG. 11B). A movable contact 413, 415, 417, respectively, cooperates with each pair of limit contacts. Each contact 413, 415, 417 is actuable by the meter coils 419, 421, 423, respectively. Once a contact 413, 415, 417 engages an associated limit contact 401, 403 or 405, 417, or 409, 411 it is held in engagement by a holding coil 425, 427, 429, respectively. Contact 413 engages 401 when the length exceeds the upper length limit (typically is 110% of standard length) and engages 403 when the length is lower than the lower length limit (90% standard length). Contact 415 engaged 405 when the diameter exceeds the upper limit (102.5% standard) and 407 when the diameter is below the lower limit (97.5% standard). Contact 417 engages 409 when the density exceeds the upper limit (102.5% standard) and 411 when the density is below the lower limit (97.5% standard).

The holding coils 425, 427, 429 are energized from conductors DP and DN and common conductor DO which supply direct current of opposite polarities derived from transformer T21 in the Program Unit through rectifiers 431 and 433. The primary Z41 of T21 is adapted to be energized from the alternating current bus L through an "Automatic" contact SW11b of the manual-automatic switch SW11, and through front contact RL6a of the delay relya RL6 in the Program Unit. Once one of the limit contacts of M1, M2 or M5 is closed it then remains closed as long as RL6 is actuated and that is until after the completion of the accept-reject operation.

Each contact 401, 403, 405, 407, 409, 411 is connected to the associated lock-in bus DP or DN through a relay RL11, RL13, RL15, RL17, RL19 and RL21, respectively. Each relay RL11 through RL19 has front contacts RL11a, RL13a, RL15a, RL17a, RL19a, RL21a and RL11c through RL21c and a back contact RL11b through RL21b, respectively. The front contacts RL11a through RL21a connect bus L to the reject bus RL when the associated relay is actuated (FIG. 11B). This energizes the reject relay RL7 in the Program Unit through back contact RL9b. Thus once one of the relays RL11 through RL21 is actuated RL7 is actuated to produce a pellet reject operation. Each pair of back contacts RL11b and RL13b, RL15b and RL17b, RL19b and RL21b are connected in series with a signal lamp G1, G2, G3, respectively, and the secondary S51, S53, S55, respectively of a transformer T23, T25, T27, respectively, which is energized between L and ground. The lamps G1, G2, G3 indicate that a pellet PE under processing has normal dimensions or density. When any of the relays RL11 through RL21 is actuated the associated lamp is deenergized to indicate an abnormality. Each of the contacts RL11c through RL21c when closed connects a counter CO1 through CO11 between L and ground. The number of pellets with excessively large or small lengths, diameters or densities is thus counted.

The relays RL11 through RL21 are preferably of the double-pole double-throw type. One pole may include the a and b contacts and the other the c contact and a back contact not in use. The circuits including S51, S53 and S55 are closed through the hot bus L; they may also be closed through ground PC.

The Program Unit includes in addition to thyratron TU11, the servo thyratron TU12 and the delay thyratron TU13. In addition the Program Unit includes the relays RL1, RL2, RL3, RL4, RL5, RL6, RL7, RL8, RL9, RC and RAJ. Generally stated these relays have the following functions.

RL1—starting relay—starts the pellet selecting process.
RL2—pellet-in-gauge relay—actuated when pellet PE is being gauged.
RL3—scale relay—actuated during weighing operation by dropping of pellet PE in pan 129.
RC—compare relay—actuates the Density Deviation Unit to carry out a comparing operation.
RL4—servo relay—enables the servo motors SM1 and SM2.
RL5—pawl relay—actuates to move pellet PE from gauge into weighing pan.
RL6—delay relay—delays sequencing until after servo motors stop.
RL7—off standard relay—actuated if dimensions or density of pellet is beyond standard limits.
RL8—accept relay—operates to accept pellets within limits.
RL9—reject relay—operates to reject pellets outside limits.
RAJ—anti-jam relay—prevents transfer of a succeeding pellet with a preceding pellet in gauge.

The contacts of the above-listed relays bear coded identifications. The identification of each contact includes the identification of the relay plus a lower-case letter. Corresponding to each relay there are as many different lower-case letters as there are contacts. Thus relay RL4 has four contacts identified as RL4a, RL4b, RL4c and RL4d. The contacts are front (normally open) or back (normally closed) and are shown in the drawings in the positions which they assume with the relays deenergized. For brevity the contacts will as a rule be referred to herein as "front" or "back" rather than as "front contact" or "back contact."

The Program Unit is energized from the alternating power bus L and from a direct current bus DL11 which may derive its power from L through rectifiers (not shown). Typcially DL11 may operate at about 150 volts direct-current and L at about 115 volts alternating-current.

The coil of RL1 (FIG. 11A) is adapted to be connected between L and ground through back RAJb and switch SW1. Switch SW1 is closed when there is a pellet PE in position to be moved into the gauging station.

The coil of RL2 is connected between L and ground through a resistor R101. This coil is normally shunted by back SW3a of SW3. SW3a is opened, and SW3b closed, when the pellet PE is in gauge.

The coils of RL3 and RC are connected between DL11 and ground through SW4, the anode 451 and the cathode 453 of scale thyratron 11TU and a resistor R103. Thyratron 11TU is biased to non-conducting condition by a positive potential impressed in the cathode 453 through a resistor R105. This bias is counteracted by a potential impulse impressed on the grid 455 through a grid resistor R107 from the output of the tube 10TU (FIG. 11B) when a pellet PE drops in pan 129. Thus a weighing and comparing operation starts when the pellet drops in the pan. 11TU and relays RL3 and RC are deenergized when SW4 opens. This happens when the pellet PE is moved from pan 21 into the accept or reject channel.

The coil RL4 is adapted to be energized in a circuit extending from L, through RL2b, the coil, the anode 461 and cathode 463 of the servo thyratron 12TU, a resistor R109 and ground. Thyratron 12TU has two grids 465 and 467. The suppressor grid 465 of 12TU is controlled from a network including C41 and resistors R121 and R123. This network is charged from L, through back RL4c, rectifier 469, to ground with that plate of capacitor C41 which is electrically nearest ground positive. This impresses a small negative bias on the suppressor grid 465 until after RL4c opens and the capacitor discharge. The small bias maintains 12TU non-conducting. The control grid 467 is controlled from a network including a variable capacitor C43. This capacitor C43 is charged from a supply including a large capacitor C45 which is charged from L through a rectifier 471. Capacitor C43 is charged from C45 through a resistor R124 and back RL2c. When RL2 is actuated RL2c is opened and RL2d is closed and the charge on capacitor C43 is discharged through resistor R125 through RL2d and a rectifier 473. Resistor R125 is connected to grid 467 through grid resistor R127. The drop across resistor R125 maintains 12TU conducting. The cathode potential of 12TU is controlled by a voltage divider in a circuit including DL11, resistors R129 and R131, a rectifier 475, front RL4d, L. When 12TU is rendered conducting RL4 is actuated and cathode 463 becomes more negative to assure conduction of 12TU.

The coil of RL5 is connected across a capacitor C51 through back RL4b. C51 is adapted to be charged from DL11 through a resistor R132 and front RL4a. When RL4 is actuated C51 is charged. When RL4 is then deenergized C51 is discharged through the coil of RL5 actuating RL5.

The coil of RL6 is connected in a circuit extending from L, through the coil, the anode 481 and cathode 483 of the delay thyratron 13TU, a resistor R133 and ground. The grid 485 of 13TU is controlled from a capacitor 353 which is maintained discharged through a resistor R135 and back RL3d. When RL3d is opened the capacitor is charged from DL11 through resistor R137, and parallel connected resistor R139 and variable resistor P51. When RL6 is actuated the conduction of 13TU is assured by conduction through R133 which renders the cathode 483 more negative. This circuit extends from L, through SW11b, front RL6a, rectifier 487, resistor R141, resistor R133, ground.

The coil of relay RL7 is connected to be energized from the reject bus LR through back RL9b. RL7 thus operates when a pellet PE is to be rejected.

The coils of reject relay RL8 and accept relay RL9 are connected to be energized by the discharge of capacitor C61 after RL6 is actuated. Thus capacitor C61 is adapted to be charged in a circuit extending from L through SW11b, RL6a, a resistor R151, a rectifier 481, capacitor C61, ground. RL7b is at this time open and when C61 attains an adequate charge it discharges through back R17a and the coil of RL9 if R67 is unactuated or front RL7b and the coil of RL8 if RL7 is actuated.

An accept counter CO15 is actuated through front RL9d if RL9 is actuated and a reject counter CO13 is actuated through front RL8d if RL8 is actuated. Also if RL9 is actuated the accept solenoid SA is actuated from a separate impulse supply through front RL9a, and if RL8 is actuated a reject solenoid SR is actuated similarly.

This supply is energized from transformer T101 through rectifier 601. High capacitor (1000 mf.) C101 is charged through resistor R201. The capacitor C100 is shunted by a resistor R103. When RL8a or RL9a is closed the capacitor C101 discharges through SR or SA solenoids producing a short, sharp movement of the ejector.

The coil of the anti-jam relay RAJ is connected in circuit L, RL2b, a rectifier 483, a resistor R153, the coil, a resistor R155 to ground. The relay RAJ on being actuated is locked in through its front RAJa and rectifier 485. RAJ is actuated with a pellet PE in gauge (RL2 actuated) and prevents actuation of RLI by opening RAJb.

The pawl solenoid SP is adapted to be energized in circuit L, back RL2a, front RL1a, back RL3a, SW11a (SW11 set for automatic), SP, ground. The energization of SP through this circuit produces the first actuation of the pawl 23 to advance the pellet PE into gauge. The retract solenoid SRE is adapted to be connected in parallel with SP through SW3b. When the pellet is in gauge and SW3 is actuated SRE is adapted to be energized with SP. At this time RL3 is actuated so that the above-described circuit for SP is open at RL3a. But when RL5 is actuated after the gauging is complete both SP and SRE are energized in circuit L, SW11b, front RL5a, SP and SRE and SW3b, ground.

Preparatory to the use of the apparatus the disconnect switches or circuit breakers (not shown) for the apparatus are closed and power is applied. The master and slave LVDT's, LVDT1 and LVDT3 and LVDT2 and LVDT5, respectively, are set so that the computer potentiometers PL and PD are centered to correspond to dimensions of a standard pellet PE and the meters M1, M2 and M3 read zero.

For this purpose a standard pellet PE is inserted in gauge and the relative positions of the primaries Z1 and Z3 and the secondary S1 and the primaries Z9 and Z11 and the secondary S5 are adjusted until the respective secondary outputs are zero. This output may be measured by an oscilloscope across the secondaries. The fields SM1F1 and SM2F1 are then each in its turn energized by a suitable switch (not shown) provided for this purpose. The fields SM1F2 and SM2F2 are then, each in its turn, connected only to S3 and S7, respectively, and the primaries and the secondaries of the slave LVDT's, LVDT3 and LVDT4 are adjusted until the secondary currents read zero with a zero marker on each of the cams CL1 and CL2 in the proper zero position. The frames of the potentiometers PL and PD, respectively, or the coupling between PL and CL1 and PD and CL2 are adjusted until the arms of PL and PD are centered and the meters M1 and M2 read zero. PLD and PLD$^2$ may be similarly adjusted with the aid of M3.

The scale 137 is then turned on its side so as to eliminate weight factors and the core 142 or LVDT5 is centered. The primary Z19 and secondaries S15 and S17 are then adjusted so that the secondary output across an oscilloscope is zero. This adjustment eliminates any torsion effect of the bearing band 153. The scale 137 is then set in weighing position and balanced mechanically with the weights 147 and 149. Switch SW5 is then closed and a standard pellet PE is dropped into the pan 129. This actuates relay RC closing RCa and RCd. The tail weights 149 and the current through the trimming coil 179 (with SW6 closed) are then adjusted until the meter M4 reads zero. The weights 149 serve for coarse adjustment and the trimming coil for fine adjustment. The potentiometer P23 may be adjusted at this point so that with the meter M3 reading zero the meter M5 also reads zero. A pellet PE having a predetermined weight deviation, say +10%, is then dropped into pan 129. The potentiometer P21 is now adjusted so that the meter M4 reads the weight deviation. Potentiometer P25 may be adjusted so that M5 reads the corresponding density deviation.

The apparatus may now be set in standby by closing switch SW annd setting switch SW11 on automatic. In standby MO1 and MO2 are energized. Belt 21 is then moving. Disc 81 is prevented from moving; the clutch 83 permits the motor MO2 to rotate relative to the disc 81. Switch SW1 is open so that RL1 is deenergized. Switch SW3 is unactuated so that RL2 is deenergized. After the apparatus is set up SW4 is opened so that 11TU, RL3 and RC are deenergized. Meters M4 and M5 are disconnected from the scale 137 by RCa and RCb. With RL2 deenergized 12TU and RL4 are deenergized and C43 is charged. With RL4 deenergized fields SM1F1 and SM2F1 and primaries Z1 and Z3 and Z9 and Z11 are deenergized. With RL4 deenergized C51 is discharged and RL5 is deenergized. With RL3 deenergized RL3d is closed and C53 is discharged. 13TU is maintained non-conducting by A.C. bias. RL6 is deenergized. With RL6 deenergized RL6a is open and the meter lock-up transformer T21 is deenergized. Also C61 is discharged. With the meters M1, M2 and M5 at zero RL11, RL13, RL15, RL17, RL19 are deenergized and the reject bus LR and RL7 are deenergized. With C61 uncharged RL8 and RL9 are deenergized. CO13, CO15, SA and SR are then deenergized. With RL2 deenergized RAJ is deenergized and the apparatus is conditioned to gauge a pellet PE. Also with RL1 and RL5 deenergized and with SW3 unactuated SP and SRE are deenergized. The Gauging Unit is then set to receive and gauge a pellet PE.

To operate the apparatus pellets PE are deposited in succession on belt 21. The first pellet PE actuates switch SW1 when it arrives in position to be placed in gauge. RL1 is then actuated. This energizes solenoid SP causing the pawl 63 to advance to its intermediate position injecting pellet PE in gauge. Since SW3 is at the beginning of this operation unactuated SRE remains deenergized. At the close of this operation SW3 is actuated. The actuation of SW3 opens SW3a actuating RL2 and opening RL2a and deenergizing SP and also, at this point, preventing energization of SRE through SW3b which is now closed. RL2b closes actuating RAJ which is locked in through RAJa. RAJb opens preventing the next pellet PE from being injected into gauge by actuation of RL1.

RL2c now opens and RL2d closes rendering 12TU conducting and energizing RL4. The closing of RL4a and the opening of RL4b charges capacitor C51. The opening of RL4c and the closing of RL4d locks 12TU in conducting condition. The closing of RL4d also applies power to SM1F1, SM2F1, Z1 and Z3 and Z9 and Z11. The unbalance produced in LVDT1 and LVDT2 causes amplifiers A1 and A3 to supply outputs to SM1F2 and SM2F2 which consist of a commercial frequency potential and superimposed on direct-current potential. Motors SM1 and SM2 now rotate so that the slave LVDT's, LVDT3 and LVDT4 counteract the unbalance produced in LVDT1 and LVDT2, respectively, by the length and diameter deviations of the pellet PE in gauge. C43 is so selected that its discharge through R125 maintains 12TU actuated long enough to achieve the balance. When the balance is achieved amplifiers A1 and A3 supply only D.C. to SM1F2 and SM2F2 dynamically braking motors SM1 and SM2 so that they stop instantaneously. Thereafter the current flow through R125 is reduced so that 12TU becomes non-conducting.

This effect of the deenergization of SM1F2 and SM2F2 may be accentuated as shown in FIG. 11. A signal is derived from SM1F1 and SM2F2 through a filter FI1 and FI2, respectively. FI1 and FI2 are tuned to the alternating outputs of A1 and A3. The outputs of the filters FI1 and FI2 are injected into the control circuit of 12TU to maintain 12TU conducting so long as A1 or A3 supply alternating current components.

With the motors SM1 and SM2 stopped the potentiometers PL and PD are in the positions set by cams CL1 and CL2, respectively. Meters M1, M2 and M3 now have readings corresponding to these settings. If pointer 413 or 415 is in engagement with contacts 401 or 403 or 405 or 407 it remains so engaged.

When 12TU is rendered non-conducting RL4 is deenergized resetting RL4c and RL4d so that SM1F1 and SM2F2, Z1 and Z3 and Z9 and Z11 are deenergized and 12TU is locked in deenergized condition. RL4a now reopens and RL4b recloses energizing RL5 for a short time interval. RL5a closes momentarily actuating SP and SRE. The pawl 63 is now returned to its initial setting on the way resetting SW3. The pellet PE receives an impact causing it to roll down guide 131 and to drop in pan 129. The resulting impulse renders 11TU conducting actuating RL3 and RC. 11TU, RL3 and RC remain actuated until SW4 is opened. The resetting of master LVDT's LVDT1 and LVDT3 does not affect the settings of PL and PD because RL4 is open and there is no power in SM1F1 or SM1F2.

RL3a opens preventing energization of SP. RL3d opens permitting C53 to charge at a rate predetermined by P51.

In the meantime SW3a recloses deenergizing RL2. RL2a recloses but SP remains unaffected because RL3a is open. RL2b reopens but RAJ is locked in at RAJa. RL2c and RL2d are reset conditioning 12TU for a succeeding operation. The opening of SW3b permits SRE to be reset.

The actuation of RC closes RCa and RCb causing a weighing operation and a density-deviation determining operation to be carried out. If the density is beyond the set limits pointer 417 closes contact 409 or 411.

While this comparing operation has been proceeding C53 has been charging. After adequate time for comparison 13TU is rendered conducting and RL6 is actuated. The closing of RL6a energizes T21. If any of the meter contacts 413, 401, 403; 415, 405, 407; 417, 409, 411 are closed, one or more of the relays R11 through RL21 are energized, LR is energized and the character of the deviations is recorded. With LR energized RL7 is actuated. If the pellet PE is within the specification RL7 remains unactuated.

The closing of RL6a and the opening of RL6b also actuates RL8 or RL9 depending on whether or not RL7 is actuated. CO15 or CO13 and SR or SA are then energized, operating the ejector 237 to move the pellet PE from the pan 129 into the Reject or Accept Channel. SW4 is then opened deenergizing 11TU and resetting RL3 and RC.

The closing of RL6a also provides a shunt circuit through rectifier 501 and resistor R155 around the coil of RAJ and RAJ is reset. This actuates RL1 and with RL3 reset another pellet is injected into gauge.

When RL3 is reset RL3 recloses discharging C53 and rendering 13TU non-conducting. RL6 is reset. This deenergizes T21 resetting RL7, RL8, RL9, SA and SR and conditioning all counters for the next count. The apparatus is now ready to process the next pellet PE.

It has been found that this apparatus can be used to process pellets at a rate of about 50 times the rate which could be achieved prior to this invention.

While preferred embodiments of this invention are disclosed herein many modifications thereof are feasible. This invention then is not to be restricted except insofar as is necessitated by the spirit of the prior art.

I claim as my invention:

1. The method of determining the deviation of the density of a pellet under test from a standard pellet with apparatus including a first analogue of the volume of said standard pellet and a second analogue of the weight of said standard pellet, the said method comprising measuring the length, L, of said pellet under test, measuring the cross-sectional area A of said pellet under test, deriving a third analogue of the product LA, deriving from said third and first analogues a fourth analogue of the difference between said first and third analogues, weighing said pellet under test and deriving from said weighing and from said second analogue a fifth analogue of the deviation of the actual weight of said pellet under test from said second analogue, and deriving a sixth analogue of the difference between said fifth and fourth analogues.

2. The method of determining the deviation of the density of a pellet under test from a standard pellet, with apparatus including a first analogue of the volume of said standard pellet and a second analogue of the weight of said standard pellet, the said method comprising determining the volume of said pellet under test and deriving from said first analogue and the measured volume a third analogue of the deviation of the volume of said pellet under test from the volume of said standard pellet, weighing said pellet under test and deriving from said second analogue and from said weighing a fourth analogue of the deviation of the weight of said pellet under test from the weight of said standard pellet, and deriving a fifth analogue of the difference between said fourth and said third analogues.

3. Apparatus for determining the deviation of the density of an object under test from a standard object comprising gauging means for determining the dimensions of said object under test, first computer means connected to said gauging means for computing an analogue of the volume of said object under test from said dimensions, second computer means for setting an analogue of the volume of said standard object, third computer means connected to said first and second means for deriving an analogue of the deviation of said volume of said object under test from said volume of said standard object, weighing means for determining the deviation of the weight of said object under test from the weight of said standard object, and fourth computer means connected to said weighing means and to said third computer means for deriving the difference between said deviation of said weight and said deviation of said volume.

4. Apparatus for determining the deviation of the density of an object under test from a standard object comprising gauging means for determining the dimensions of said object, first computer means connected to said gauging means for computing an analogue of the volume of said object from said dimensions, said first computer means including variable impedance means for setting said dimensions, said impedance means being capable of being set over its whole range between an extreme setting corresponding to a relatively low percentage below the corresponding dimensions of said standard object and an opposite extreme setting corresponding to a relatively low percentage above said corresponding dimensions, second computer means for setting an analogue of the volume of said standard, third computer means connected to said first and second means for deriving an analogue of the deviation of said volume of said object from said volume of said standard, weighing means for determining the deviation of the weight of said object from the weight of said standard, and fourth computer means connected to said weighing means and to said third computer means for deriving the difference between said deviation of said weight and said deviation of said volume.

5. Apparatus for determining the deviation of the density of an object under test from a standard object comprising gauging means for determining the dimensions of said object, first computer means connected to said gauging means for computing an analogue of the volume of said object from said dimensions, second computer means for setting an analogue of the volume of said standard, third computer means connected to said first and second means for deriving an analogue of the deviation of said volume of said object from said volume of said standard, weighing means for determining the deviation of the weight of said object from the weight of said standard, fourth computer means connected to said weighing means and to said third computer means for deriving the difference between said deviation of said weight and said deviation of said volume, and means to be connected to said object for advancing said object first into said gauging means and then following completion of the determination of said dimensions into said weighing means.

6. Apparatus for determining the density deviation of objects under classification from the density of a standard object comprising object-volume measuring means to which each object under classification is subjected, object-weight measuring means to which each object under classification is subjected, and means connected to said volume and weight measuring means for deriving said density deviation of each subjected object from the measurements on said subjected object, the object-volume measuring means determining the deviation of the volume of said subjected object from the volume of said standard and the object-weight measuring means determines the deviation of the weight of said subjected object from the weight of said standard, and said deriving means including computer means for computing said density deviation from said weight and volume deviations for each subjected object.

7. Apparatus according to claim 6 wherein the computer means determines the density deviation for the subjected object by subtracting the volume deviation from the weight deviation for said subjected object.

8. Apparatus according to claim 6 for determining density deviation wherein the object volume measuring means includes gauging means for determining the dimensions of the subjected object, first computer means connected to said gauging means for computing an analogue of the volume of said object from said dimensions, second computer means for setting an analogue of the volume of the standard object, third computer means connected to said first and second means for deriving an analogue of the deviation of said volume of said subjected object, and also characterized by weight measuring means including weighing means for determining the deviation of the weight of a subjected object from the weight of said standard object, and further characterized by that the deriving means includes fourth computer means connected to said weighing means and to said third computer means for deriving said deviation of density of said subjected object from said deviation of the weight and said deviation of the volume.

9. Apparatus according to claim 8 wherein the fourth computer derives the deviation of the density by computing the difference between the deviation of the weight and the deviation of the volume.

10. Apparatus according to claim 8 wherein the first computer means includes at the point of computation variable impedance means capable of being set over its whole range between an extreme setting corresponding to a relatively low percentage below the dimension of said standard corresponding to said impedance means and an opposite extreme setting corresponding to a relatively low percentage above the dimensions of said standard corresponding to said impedance means.

11. Apparatus according to claim 6 characterized by a conveyor for the objects under classification and by means cooperative with said conveyor, the volume measuring means and the weight measuring means to advance said object automatically through said volume measuring means and through said weight measuring means and to subject said object separately to the volume and weight determining operations of said volume-measuring means and said weight measuring means.

12. Apparatus according to claim 11 wherein the cooperative means includes indexing means cooperative with the volume-measuring means and the weight-measuring means and, responsive to the absence of an object from both of said means, to carry out a cycle in which said indexing means indexes an object into one of said means, and responsive to the completion of the operation of said one means on said indexed object indexes said last-named object into the other of said means, and responsive to the completion of the operation of said other means on said indexed object removes said object from said other means.

13. Apparatus according to claim 11 characterized by means responsive to the presence of the object in the volume-measuring means or the weight-measuring means for preventing renewal of a cycle of operation of said indexing means until after the renewal of said object from the other means.

14. Classification apparatus for classifying objects in accordance with their dimensions and weights including means to be connected to each object for determining the dimensions of said last-named object, means to be connected to said last-named object for determining the weight of said last-named object, said dimension and weight determining means operating separately and being disposed to operate in succession, and means connected to said dimensions and weight determining means for classifying said last-named object in accordance with its weight and dimensions characterized by a conveyor for the objects under classification and by means cooperative with said conveyor, with the dimensions determining means, and with the weight determining means to advance each said object into dimensions determining relationship with said dimensions determining means and into weight determining relationship with said weight determining means.

15. The method of selecting for classification from a plurality of objects under observation only those objects having a density within a predetermined range of the density of a standard object, said standard object having a predetermined standard volume and a predetermined standard weight, the said method comprising comparing the volume of each object under observation with said standard volume, comparing the weight of said last-named object under observation with said standard weight, deriving the density deviation for said last-named object under observation from the said comparisons, and selecting only those objects from said plurality for which the density deviation is less than a predetermined difference corresponding to the limits of said range of density, the said method being characterized by that in said comparisons the volume deviation from said standard volume and the weight deviation from said standard weight of each object is derived and the density deviation is determined from said volume and weight deviations.

References Cited by the Examiner
UNITED STATES PATENTS

| | | | |
|---|---|---|---|
| 1,902,512 | 3/1933 | Mehl | 177—145 |
| 2,038,458 | 4/1936 | Von Segebaden | 177—145 |
| 2,568,255 | 9/1951 | Schieser | 209—121 |
| 2,664,557 | 12/1953 | Sargrove | 340—213 |
| 2,688,740 | 9/1954 | Merrill et al. | 340—213 |
| 2,689,082 | 9/1954 | Kolisch | 235—179 |
| 2,692,357 | 10/1954 | Nilson | 318—28 |
| 2,708,368 | 5/1955 | Kolisch | 73—432 |
| 2,708,730 | 5/1955 | Alexander et al. | 318—28 |
| 2,725,193 | 11/1955 | Kolisch | 235—179 |
| 2,726,061 | 12/1955 | Schieser | 177—48 |
| 2,727,391 | 12/1955 | Kolisch | 73—432 |
| 2,790,549 | 4/1957 | Bize | 209—121 |
| 2,925,166 | 2/1960 | Sawdey | 198—19 |
| 2,935,172 | 5/1960 | Todoroff | 198—19 |

MALCOLM A. MORRISON, *Primary Examiner.*

CLAUDE A. LE ROY, *Examiner.*